(12) United States Patent
Bauman

(10) Patent No.: US 6,854,424 B2
(45) Date of Patent: Feb. 15, 2005

(54) KENNEL FLOOR SYSTEM

(76) Inventor: Raymond J. Bauman, 13901 River Rd., Grand Rapids, OH (US) 43522

( * ) Notice: Subject to any disclaimer, the term of this patent is extended or adjusted under 35 U.S.C. 154(b) by 110 days.

(21) Appl. No.: 10/212,591

(22) Filed: Aug. 5, 2002

(65) Prior Publication Data

US 2004/0020445 A1 Feb. 5, 2004

(51) Int. Cl.$^7$ ................................................. A01K 1/02
(52) U.S. Cl. ........................ 119/482; 119/527; 119/436; 119/458
(58) Field of Search ................................. 119/455, 456, 119/457, 472, 475, 479, 482, 509, 480, 525, 527, 528, 529, 530, 450, 436, 458, 452, 448

(56) References Cited

U.S. PATENT DOCUMENTS

| | | | |
|---|---|---|---|
| 3,550,558 A | 12/1970 | Sachs | |
| 3,662,713 A | 5/1972 | Sachs | |
| 3,662,714 A | 5/1972 | Poon | |
| 3,895,606 A | 7/1975 | Galloway | |
| 3,951,106 A | 4/1976 | Wright | |
| 4,252,082 A | 2/1981 | Herring | |
| 4,402,282 A | 9/1983 | Steidinger | |
| RE31,556 E | 4/1984 | Buchanan | |
| 4,696,259 A | 9/1987 | Fewox | |
| 4,794,879 A | 1/1989 | Thom et al. | |
| 5,116,256 A | 5/1992 | Allen | |
| 5,335,617 A | 8/1994 | Hoffman | |
| 5,476,066 A | 12/1995 | Hoffman | |
| 5,666,905 A | * 9/1997 | Mackin et al. | 119/448 |
| 6,021,739 A | * 2/2000 | Allen | 119/458 |
| 6,152,080 A | * 11/2000 | Allen | 119/452 |
| 6,568,350 B1 | * 5/2003 | Savard et al. | 119/458 |

FOREIGN PATENT DOCUMENTS

FR 000545539 A 10/1922
FR 001204089 A 1/1960

* cited by examiner

*Primary Examiner*—Yvonne R. Abbott
(74) *Attorney, Agent, or Firm*—MacMillan, Sobanski & Todd, LLC

(57) ABSTRACT

A kennel floor system for use in a building including a lower floor unit and an upper floor unit supported on walls that extend between the lower and upper floor units.

28 Claims, 8 Drawing Sheets

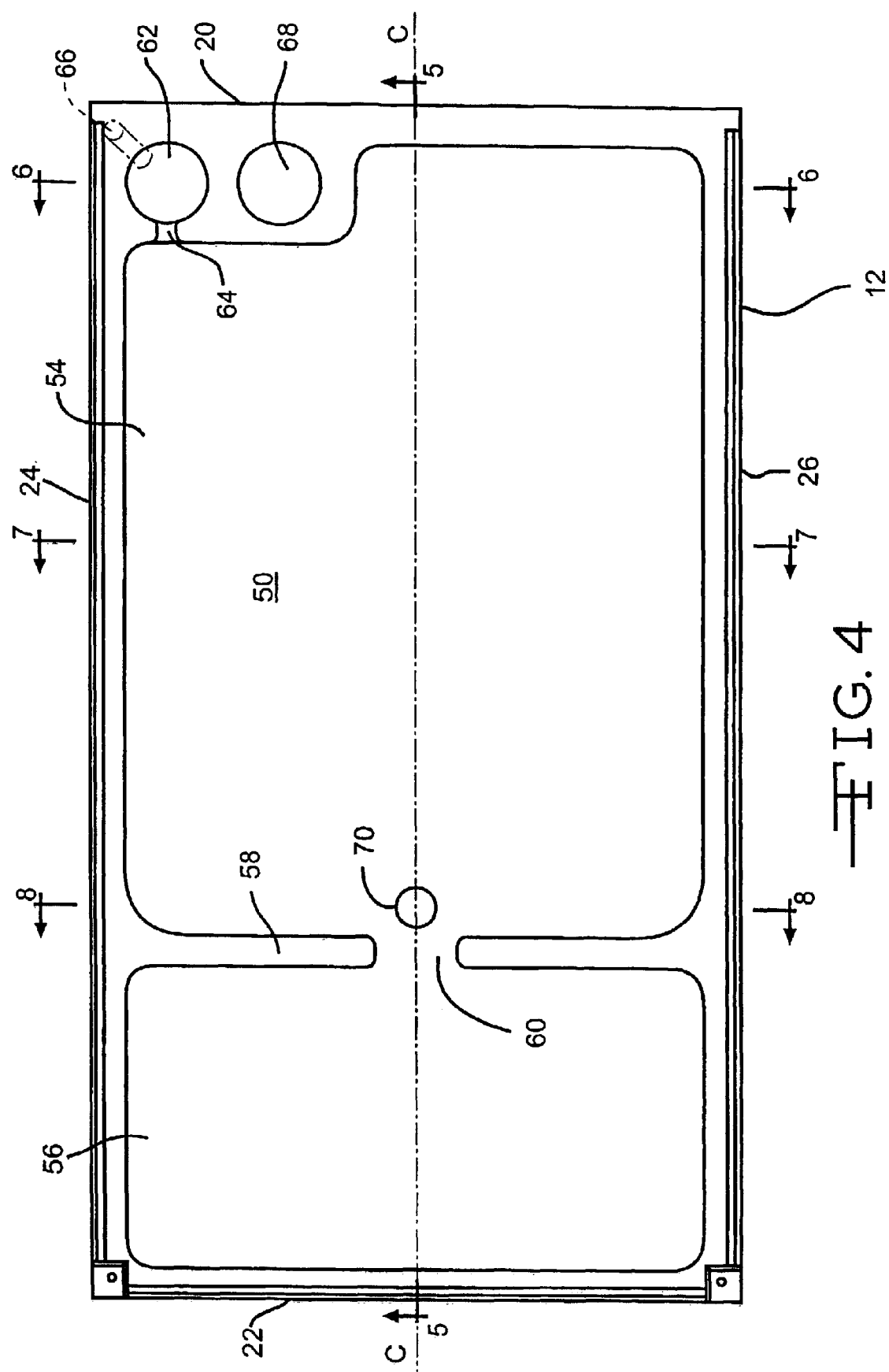

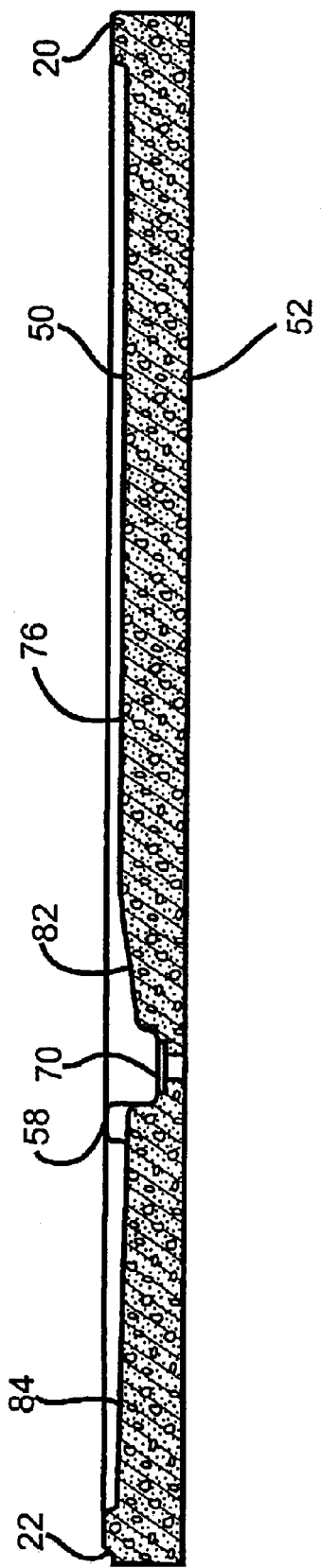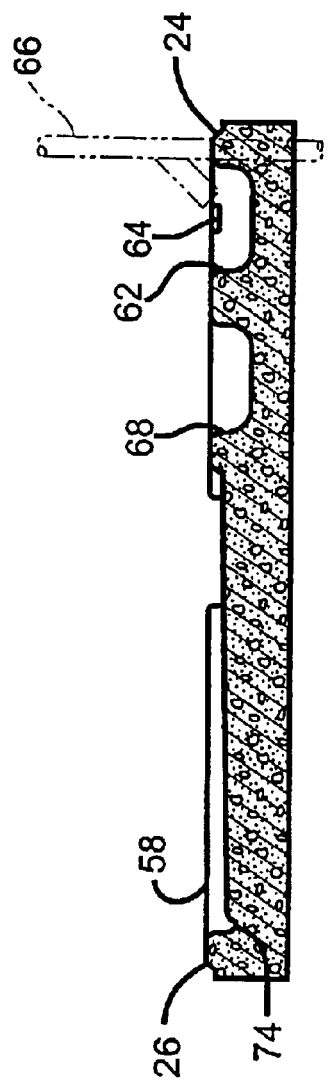

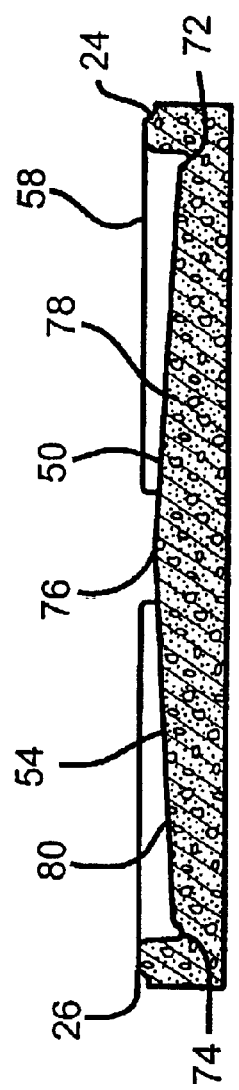
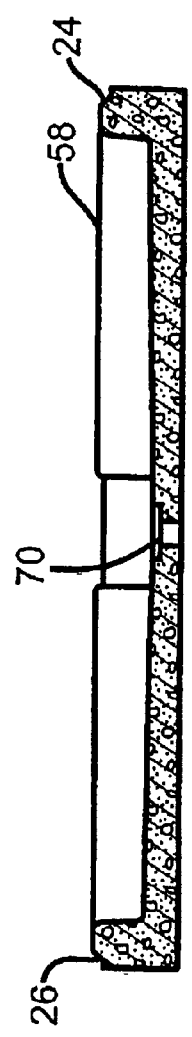

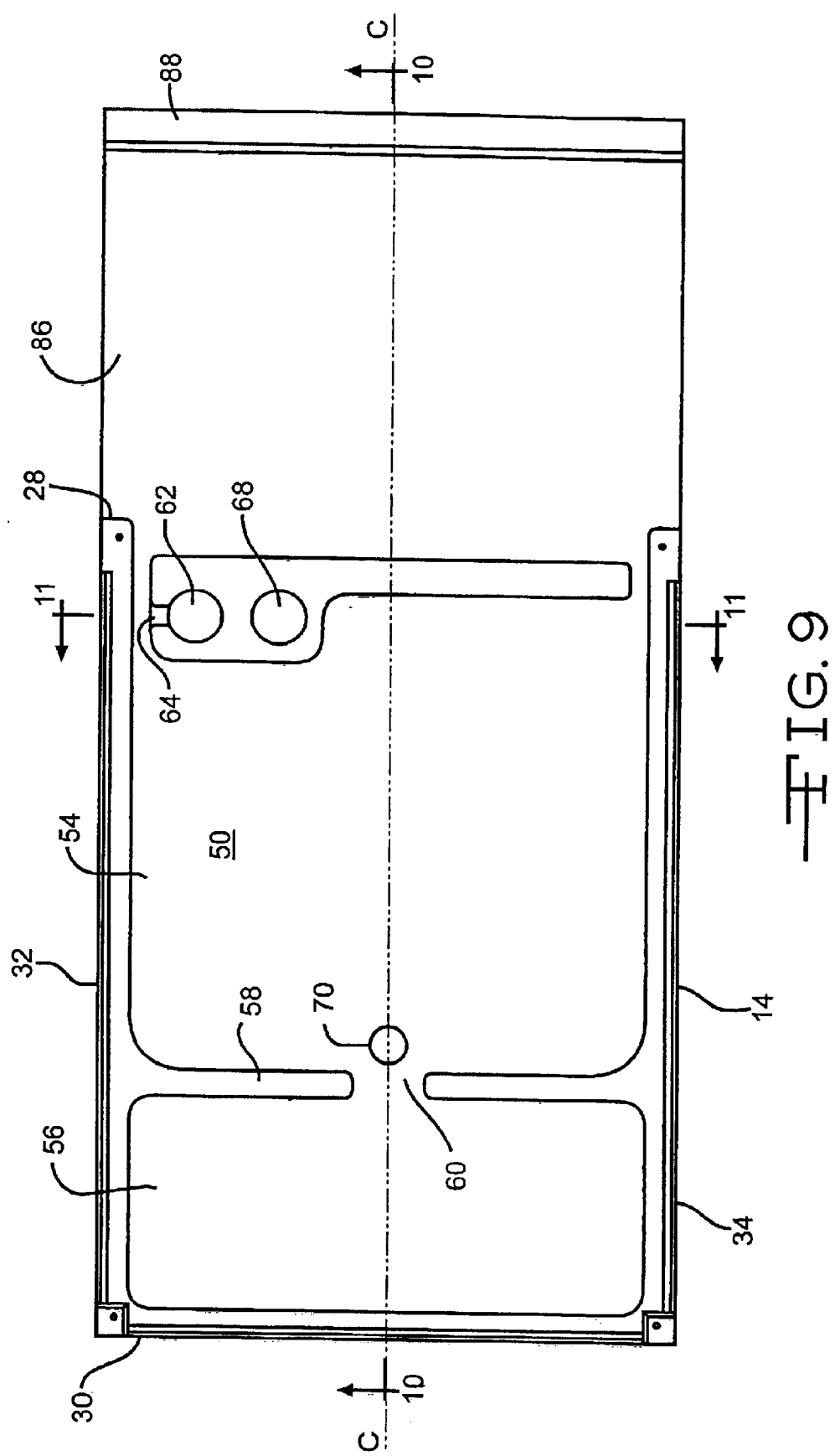

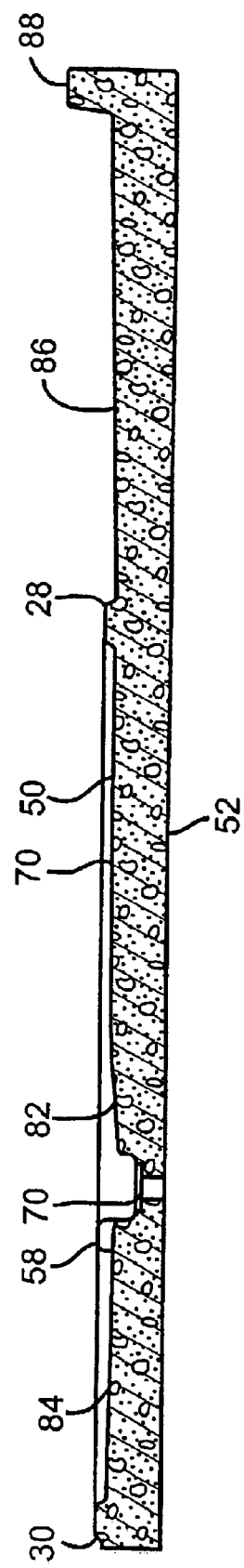
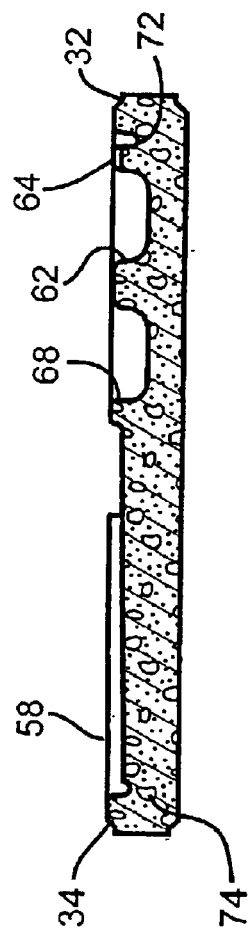

KENNEL FLOOR SYSTEM

BACKGROUND OF THE INVENTION

The present invention relates to animal housing. More specifically, the invention is directed to a kennel floor system.

In the past, kennels were constructed of cages on the floor of a building. In most cases, the floors were flat and did not include drainage.

Modular kennel structures were developed that included various types of flooring, cages and drainage systems. However, it has been found that some of these prior systems cannot be efficiently assembled and disassembled. Further, some of these systems are weak, difficult to clean and fire hazards. Finally, it has been found that some of these prior systems do not provide satisfactory accommodations for animals.

There is a need for a durable, easy to clean, fire proof kennel floor system that can be efficiently assembled and disassembled. Further, there is a need for a kennel floor system that provides proper accommodations for animals in the system. The present invention satisfies these and other needs.

SUMMARY OF THE INVENTION

The present invention is directed to a kennel floor system including a lower floor unit having a front, a back, a first side and a second side. The system includes a divider wall extending upwardly adjacent to the back of the lower floor unit. A first support wall extends upwardly adjacent to the first side of the lower floor unit. A second support wall extends upwardly adjacent to the second side of the lower floor unit.

The system includes an upper floor unit having a front, a back, a first side and a second side. The back, first side and second side of the upper unit are positioned on the divider wall, first support wall and second support wall, respectively, over the lower floor unit.

The primary object of the present invention is to provide an improved kennel floor system that can be efficiently assembled and disassembled.

An important object of the present invention is to provide a durable kennel floor system.

An important object of the present invention is to provide a kennel floor system that is easy to clean.

An important object of the present invention is to provide a fire proof kennel floor system.

An important object of the present invention is to provide a kennel floor system that includes proper accommodations for animals.

Other objects and advantages of the present invention will become apparent to those skilled in the art upon a review of the following detailed description of the preferred embodiments and the accompanying drawings.

BRIEF DESCRIPTION OF THE DRAWINGS

FIG. 4 is a top view of a lower floor unit according to the present invention;

FIG. 5 is a cross-sectional view taken along line 5—5 of FIG. 4;

FIG. 6 is a cross-sectional view taken along line 6—6 of FIG. 4;

FIG. 7 is a cross-sectional view taken along line 7—7 of FIG. 4;

FIG. 8 is a cross-sectional view taken along line 8—8 of FIG. 4;

FIG. 9 is a top view of an upper floor unit according to the present invention;

FIG. 10 is a cross-sectional view taken along line 10—10 of FIG. 9; and

FIG. 11 is a cross-sectional view taken along line 11—11 of FIG. 9.

DETAILED DESCRIPTION OF THE PREFERRED EMBODIMENTS

Figure 1:
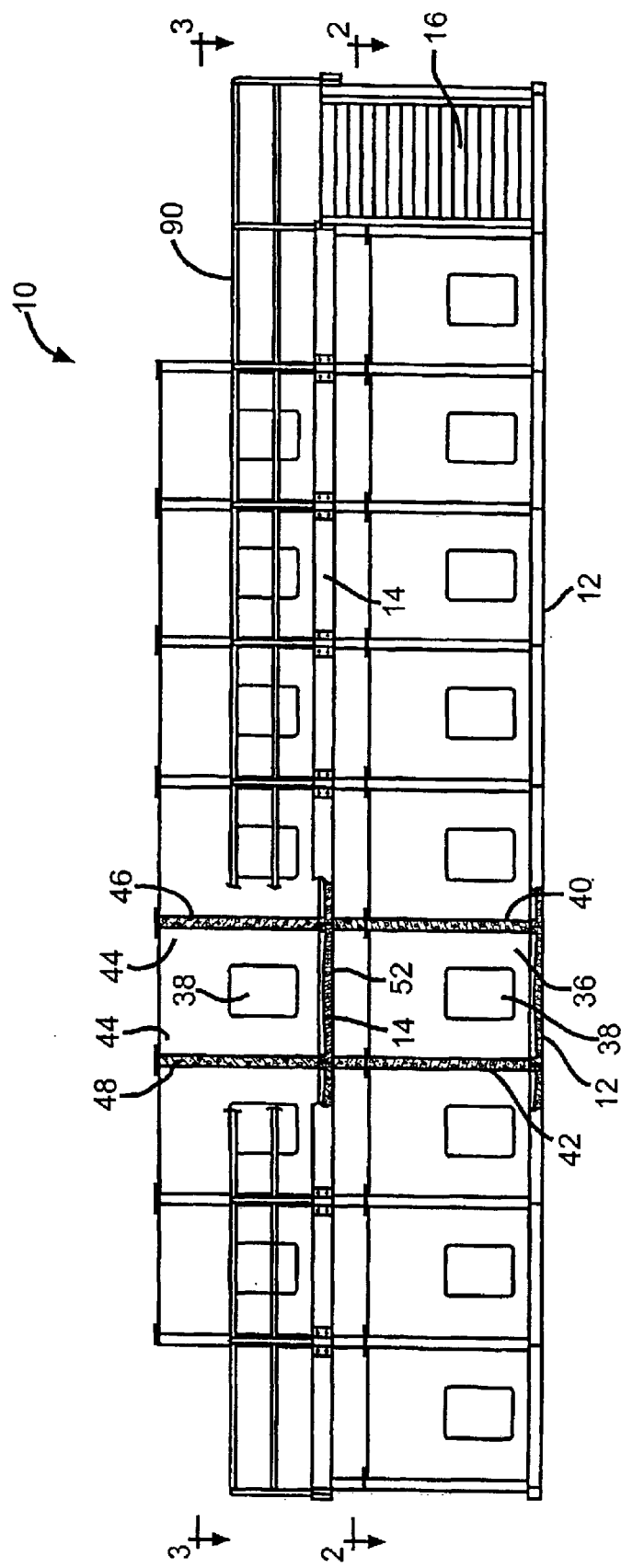
FIG. 1 is a front elevational view of a kennel floor system according to the present invention.

The preferred embodiments and best mode of the present invention will now be described in detail with reference being made to the drawings. The kennel floor system of the present invention is indicated generally in the drawings by the reference number "10".

Figure 2:
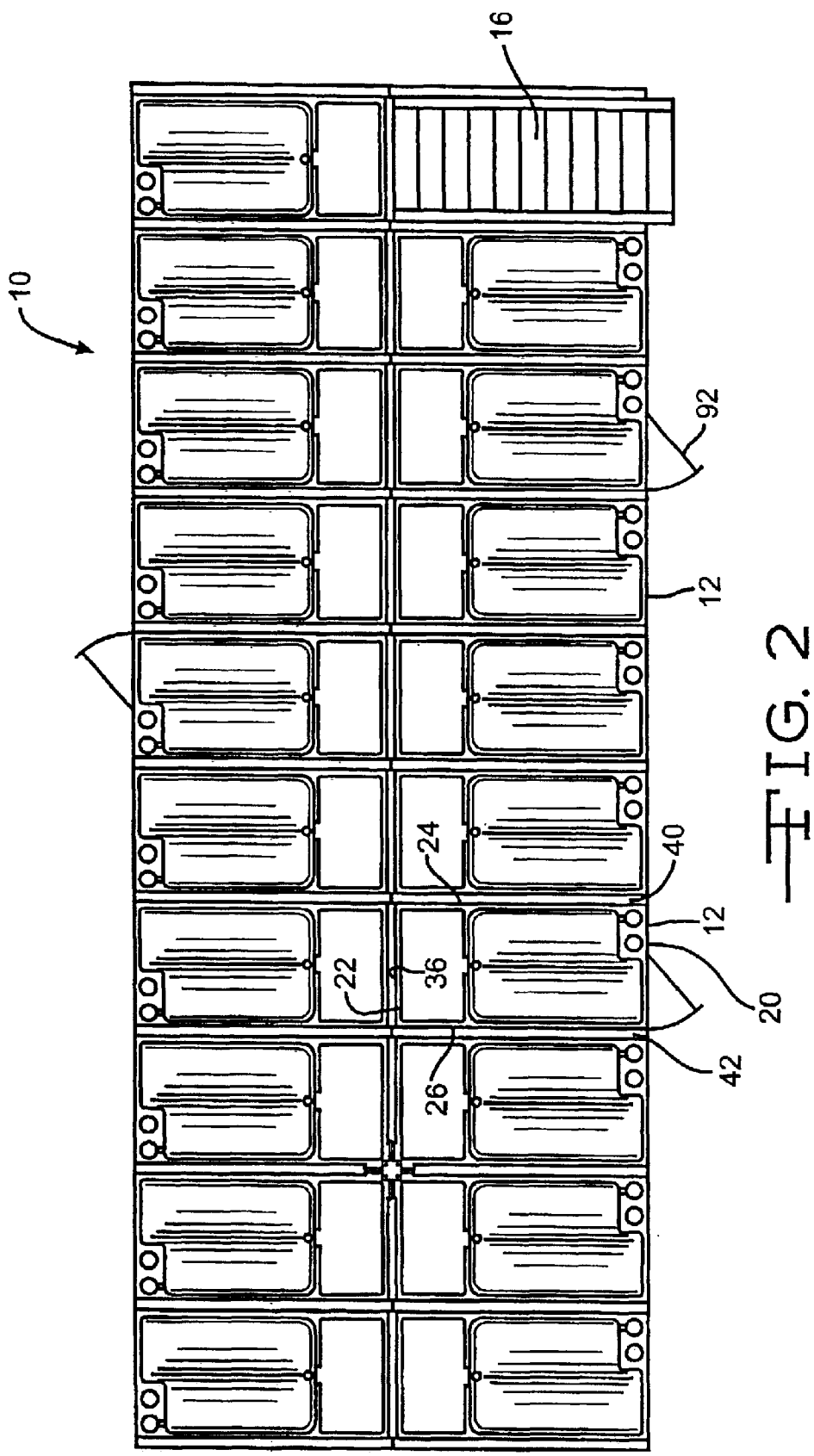
FIG. 2 is a cross-sectional view taken along line 2—2 of FIG. 1.
Figure 3:
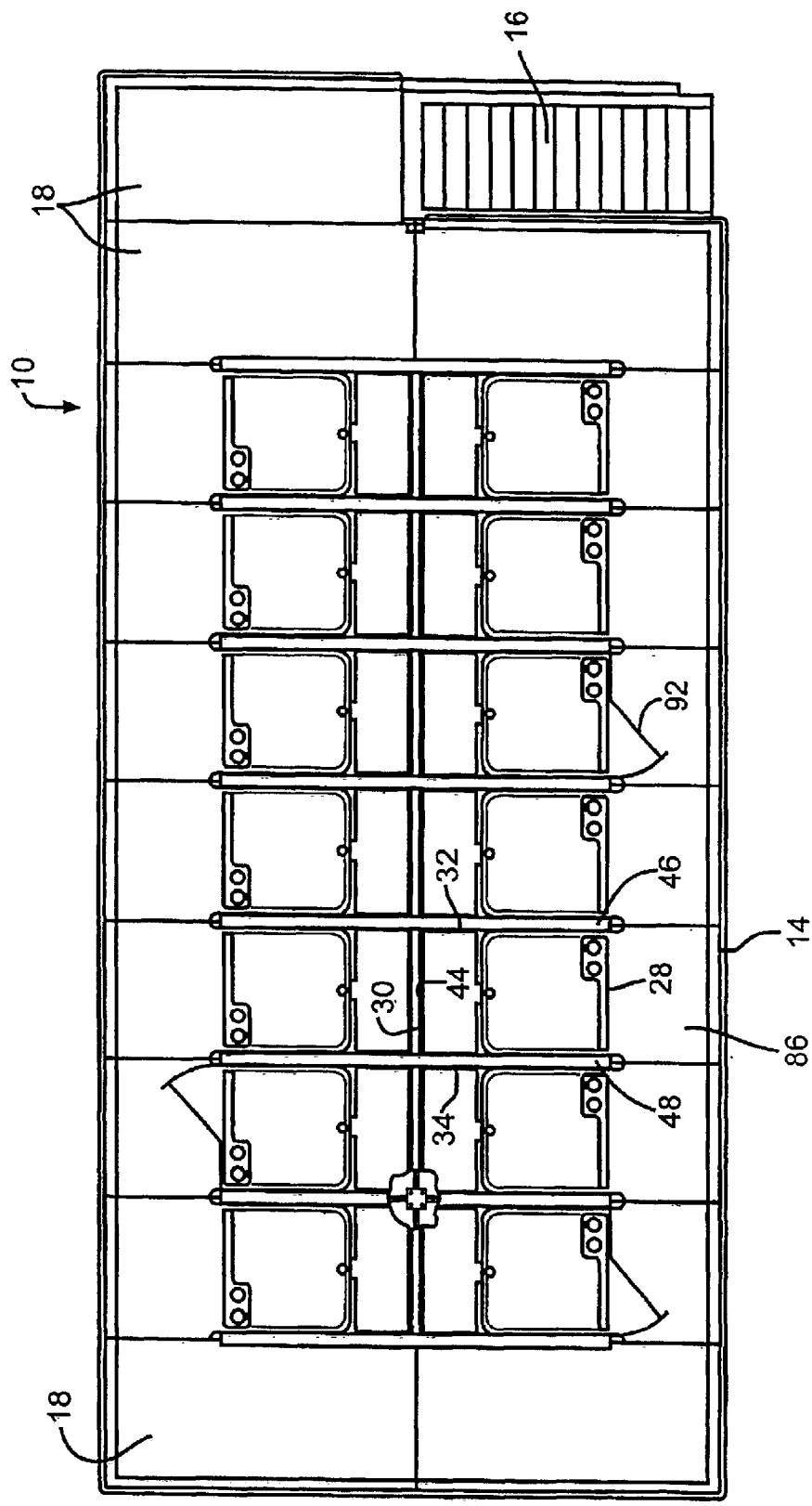
FIG. 3 is a cross-sectional view taken along line 3—3 of FIG. 1.

Referring to FIGS. 1–3, the kennel floor system 10 includes a plurality of lower floor units 12 and a plurality of upper floor units 14. In the present embodiment, there are nineteen lower floor units 12 and fourteen upper floor units 14. However, it should be understood that the number of lower and upper floor units 12 and 14 can vary depending upon the number of units desired and the size and shape of a building in which the system 10 is constructed. The building can be an existing structure or it can be a new construction designed specifically for use with the system 10. The system 10 can be disassembled for movement and reassembly in another building.

Referring still to FIGS. 1–3, the system 10 is two-story and includes a stair unit 16 and a plurality of floor panels 18. In the embodiment shown in the drawings, the system includes a single stair unit 16 and five floor panels 18. However, the number of stair units 16 and floor panels 18 can vary depending on the number of units desired and the size and shape of the building. In an alternative embodiment, the kennel floor system 10 of the present invention can include only a plurality of lower floor units 12 without the upper floor units 14, the stair unit 16 and the floor units 18.

Referring to FIGS. 4 and 9, the lower floor unit 12 includes a front 20, a back 22, a first side 24 and a second side 26. As shown in FIG. 9, the upper floor unit 14 includes a front 28, a back 30, a first side 32 and a second side 34.

Referring again to FIGS. 1–3, the system 10 includes a divider wall 36 that extends upwardly from the back 22 of the lower floor unit 12 to the back 30 of the upper floor unit 14. In a preferred embodiment, the divider wall 36 includes an opening 38 that can include a door to allow for the passage of animals between adjoining units.

Still referring to FIGS. 1–3, the system 10 includes a first support wall 40 that extends upwardly between the first side 24 of the lower floor unit 12 and the first side 32 of the upper floor unit 14. A second support wall 42 extends upwardly between the second side 26 of the lower floor unit 12 and the second side 34 of the upper floor unit 14. As it will be appreciated, the number of divider walls 36, first support walls 40 and second support walls 42 is dependent on the number of lower and upper floor units 12 and 14 included in the system 10.

As shown in FIG. 1, the upper floor unit 14 is positioned above the lower floor unit 12 on the divider wall 36, the first support wall 40 and the second support wall 42. The system 10 includes an upper divider wall 44 having an opening 38, an upper first support wall 46 and an upper second support wall 48 positioned at the back 30, the first side 32 and the second side 34 of the upper floor unit 14, respectively.

The lower floor units 12, the upper floor units 14, the stair unit 16, the floor units 18, the divider walls 36, the first support walls 40, the second support walls 42, the upper divider walls 44, the upper first support walls 46 and the upper second support walls 48 are preferably constructed of precast concrete. The precast concrete is strong, durable and fire proof. This material allows for the structural construction of the system 10. Further, these components can be efficiently and accurately constructed of precast concrete at a remote site and then assembled at the building site.

Referring to FIGS. 4–8, the lower floor unit 12 in addition to the front 20, the back 22, the first side 24 and the second side 26 includes a top 50 and a bottom 52. As it will be appreciated, the bottom 52 rests on either an existing floor structure or on a specially prepared surface in the building in which the system 10 is assembled.

The top 50 of the lower floor unit 12 includes an integral exercise area 54 positioned at the front 20 and an integral bed area 56 positioned at the back 22. The exercise and bed areas 54 and 56 are divided by a raised portion 58 that extends about the perimeter of the top 50 and toward a center line C as shown in broken lines in FIG. 4. The raised portion 58 defines an opening 60 at the center line C. The raised portion 58 at the front 20 includes an integral water receptacle 62 having an overflow drain 64. The system 10 can include a water faucet 66 to fill the water receptacle 62 with fresh water. The overflow drain 64 maintains the water level within the water receptacle 62 at a predetermined level. As described below, water flowing through the overflow drain 64 can be used to flush the top 50. The raised portion 58 defines an integral food receptacle 68. As it will be appreciated, the water receptacle 62 and the food receptacle 68 are raised to prevent inflow of contaminants.

As shown in FIG. 4, the system 10 includes a drain 70 positioned along the center line C adjacent to the opening 60 of the raised portion 58. As shown in FIGS. 6 and 7, the system 10 includes a first trough 72 positioned along the first side 24 and a second trough 74 positioned along the second side 26. The overflow drain 64 of the water receptacle 62 is in fluid communication with the first trough 72.

Referring still to FIGS. 4–8, the top 50 of the lower floor unit 12 includes a plurality of sloped portions to cause fluid, such as urine and wash water, to flow to the drain 70. As shown in FIG. 7, the top 50 in the exercise area 54 includes a ridge 76 that runs along the center line C as shown in FIG. 4. A first sloped portion 78 descends from the ridge 76 to the first trough 72 and a second sloped portion 80 descends from the ridge 76 to the second trough 74. Referring to FIG. 5, a third sloped portion 82 descends from the ridge 76 to the drain 70. As shown in FIG. 5, the top 50 in the bed area 56 includes a fourth sloped portion 84 that descends from the back 22 to the opening 60 of the raised portion 58 to allow for fluid flow to the drain 70.

Referring now to FIGS. 9–11, the upper floor unit 14 includes the features as described above with respect to the lower floor unit 12. Accordingly, the reference numbers used with respect to the lower unit 12 have been used with respect to the upper floor unit 14. In addition to these features, the upper floor unit 14 includes an integral walkway 86 that extends outwardly from the front 28. An integral raised curb 88 is positioned along the outer edge of the walkway 86. As shown in FIG. 1, a guardrail 90 is attached to the curb 88. As shown in FIGS. 2 and 3, gates or doors 92 are positioned on the lower and upper floor units 12 and 14 to keep the animals in the units.

Referring to FIGS. 1–3, the system 10 of the present invention can be constructed in a variety of ways. In a preferred embodiment, as shown in the drawings, the individual components are held together by plate and bolt construction. However, the system 10 can also be constructed using other construction methods such as post tension construction.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A kennel floor system comprising:
   a lower floor unit having a front, a back, a first side and a second side;
   a divider wall extending upwardly adjacent to said back of said lower floor unit;
   a first support wall extending upwardly adjacent to said first side of said lower floor unit;
   a second support wall extending upwardly adjacent to said second side of said lower floor unit; and
   an upper floor unit having a front, a back, a first side and a second side said upper floor unit being supported on said divider wall, first support wall and second support wall, respectively, over said lower floor unit.

2. The system of claim 1, wherein said lower floor unit is constructed of precast concrete.

3. The system of claim 1, wherein said lower floor unit includes a drain.

4. The system of claim 3, wherein said lower floor unit includes a ridge and at least two sloped portions for guiding fluid to said drain.

5. The system of claim 4, wherein said lower floor unit includes at least two troughs positioned adjacent to said at least two sloped portions for guiding fluid to said drain.

6. The system of claim 1, wherein said lower floor unit includes an integral water receptacle.

7. The system of claim 1, wherein said lower floor unit includes an integral food receptacle.

8. The system of claim 1, wherein said lower floor unit includes an integral exercise area adjacent to said front and an integral bed area adjacent to said back.

9. The system of claim 1, wherein said divider wall is constructed of precast concrete.

10. The system of claim 1, wherein said divider wall includes an opening.

11. The system of claim 1, wherein said first and second support walls are constructed of precast concrete.

12. The system of claim 1, wherein said upper floor unit is constructed of precast concrete.

13. The system of claim 1, wherein said upper floor unit includes a drain.

14. The system of claim 13, wherein said upper floor unit includes a ridge and at least two sloped portions for guiding fluid to said drain.

15. The system of claim 14, wherein said upper floor unit includes at least two troughs positioned adjacent to said at least two sloped portions for guiding fluid to said drain.

16. The system of claim 1, wherein said upper floor unit includes an integral water receptacle.

17. The system of claim 1, wherein said upper floor unit includes an integral food receptacle.

18. The system of claim 1, wherein said upper floor unit includes an integral exercise area adjacent to said front and an integral bed area adjacent to said back.

19. The system of claim 1, wherein said upper floor unit includes an integral walkway.

20. The system of claim 19, wherein said walkway includes an integral curb.

21. The system of claim 19, wherein said system includes a guardrail adjacent to said walkway.

22. The system of claim 1, wherein said upper floor unit includes an integral walkway, said system includes a stair unit adjacent to said walkway.

23. The system of claim 22, wherein said stair unit is constructed of precast concrete.

24. The system of claim 22, wherein at least one floor panel is positioned between said walkway and said stair unit.

25. The system of claim 24, wherein said floor panel is constructed of precast concrete.

26. A floor unit for a kennel floor system comprising:

a floor having a front, a back, a first side and a second side;

a drain positioned in said floor;

an integral exercise area having a sloped portion for guiding fluid to said drain;

an integral bed area having a sloped portion for guiding fluid to said drain;

an integral water receptacle; and an integral food receptacle.

27. The floor unit of claim 26, wherein said floor unit is constructed of precast concrete.

28. The floor unit of claim 26, wherein said floor unit includes an integral walkway.

* * * * *